US007962331B2

(12) United States Patent
Miller et al.

(10) Patent No.: US 7,962,331 B2
(45) Date of Patent: Jun. 14, 2011

(54) SYSTEM AND METHOD FOR TUNING AND TESTING IN A SPEECH RECOGNITION SYSTEM

(75) Inventors: Edward S. Miller, San Diego, CA (US); James F. Blake, II, San Diego, CA (US); Keith C. Herold, San Diego, CA (US); Michael D. Bergman, Poway, CA (US); Kyle N. Danielson, San Diego, CA (US); Alexandra L. Auckland, El Cajon, CA (US)

(73) Assignee: Lumenvox, LLC, San Diego, CA (US)

( * ) Notice: Subject to any disclaimer, the term of this patent is extended or adjusted under 35 U.S.C. 154(b) by 124 days.

(21) Appl. No.: 12/255,564

(22) Filed: Oct. 21, 2008

(65) Prior Publication Data

US 2009/0043576 A1 Feb. 12, 2009

Related U.S. Application Data

(62) Division of application No. 10/725,281, filed on Dec. 1, 2003, now Pat. No. 7,440,895.

(51) Int. Cl.
*G10L 11/06* (2006.01)
(52) U.S. Cl. .................. 704/215; 704/231; 704/235
(58) Field of Classification Search .................. 704/215, 704/210, 208, 214, 231, 235, 278, 276, 257, 704/270, 270.1, 3, 4, 7, 272; 379/266.1
See application file for complete search history.

(56) References Cited

U.S. PATENT DOCUMENTS

| | | |
|---|---|---|
| 5,384,892 A | 1/1995 | Strong |
| 5,390,278 A | 2/1995 | Gupta et al. |
| 5,615,296 A | 3/1997 | Stanford et al. |
| 5,649,057 A | 7/1997 | Lee et al. |
| 5,715,369 A | 2/1998 | Spoltman et al. |
| 5,719,921 A | 2/1998 | Vysotsky et al. |
| 5,724,481 A | 3/1998 | Garberg et al. |
| 5,774,628 A | 6/1998 | Hemphill |
| 5,867,817 A | 2/1999 | Catallo et al. |
| 6,006,185 A | 12/1999 | Immarco |
| 6,073,097 A | 6/2000 | Gould et al. |
| 6,134,527 A | 10/2000 | Meunier et al. |
| 6,138,097 A | 10/2000 | Lockwood et al. |
| 6,161,087 A * | 12/2000 | Wightman et al. ........... 704/215 |
| 6,173,266 B1 | 1/2001 | Marx et al. |
| 6,246,980 B1 | 6/2001 | Glorion et al. |
| 6,263,308 B1 | 7/2001 | Heckerman et al. |
| 6,298,324 B1 | 10/2001 | Zuberec et al. |
| 6,321,198 B1 | 11/2001 | Hank et al. |
| 6,370,503 B1 | 4/2002 | Ortega et al. |
| 6,377,921 B1 | 4/2002 | Bahl et al. |
| 6,438,520 B1 | 8/2002 | Curt et al. |
| 6,970,554 B1 * | 11/2005 | Peterson et al. ........... 379/266.1 |
| 6,975,985 B2 | 12/2005 | Kriechbaum et al. |
| 7,103,542 B2 * | 9/2006 | Doyle .......................... 704/231 |
| 7,260,535 B2 | 8/2007 | Galanes et al. |
| 2002/0138261 A1 | 9/2002 | Ziegelmiller |
| 2002/0138276 A1 | 9/2002 | Damiba |
| 2002/0152071 A1 | 10/2002 | Chaiken et al. |
| 2002/0188447 A1 | 12/2002 | Coon et al. |
| 2005/0091057 A1 | 4/2005 | Phillips et al. |

* cited by examiner

*Primary Examiner* — Huyen X. Vo
(74) *Attorney, Agent, or Firm* — Knobbe Martens Olson & Bear LLP

(57) ABSTRACT

Systems and methods for improving the performance of a speech recognition system. In some embodiments a tuner module and/or a tester module are configured to cooperate with a speech recognition system. The tester and tuner modules can be configured to cooperate with each other. In one embodiment, the tuner module may include a module for playing back a selected portion of a digital data audio file, a module for creating and/or editing a transcript of the selected portion, and/or a module for displaying information associated with a decoding of the selected portion, the decoding generated by a speech recognition engine. In other embodiments, the tester module can include an editor for creating and/or modifying a grammar, a module for receiving a selected portion of a digital audio file and its corresponding transcript, and a scoring module for producing scoring statistics of the decoding based at least in part on the transcript.

28 Claims, 9 Drawing Sheets

SYSTEM AND METHOD FOR TUNING AND TESTING IN A SPEECH RECOGNITION SYSTEM

RELATED APPLICATIONS

This application is a divisional of U.S. application Ser. No. 10/725,281, filed Dec. 1, 2003 and titled "SYSTEM AND METHOD FOR TUNING AND TESTING IN A SPEECH RECOGNITION SYSTEM," which is related to U.S. application Ser. No. 10/317,837, filed Dec. 10, 2002 and titled "SPEECH RECOGNITION SYSTEM HAVING AN APPLICATION PROGRAM INTERFACE," U.S. Application Ser. No. 60/451,227, filed Feb. 28, 2003 and titled "SPEECH RECOGNITION CONCEPT CONFIDENCE MEASUREMENT," and U.S. Application Ser. No. 60/451,353, filed Feb. 27, 2003 and titled "CALL FLOW OBJECT MODEL IN A SPEECH RECOGNITION SYSTEM," each of which is hereby incorporated herein in its entirety by reference.

BACKGROUND OF THE INVENTION

1. Field of the Invention

The invention generally relates to speech recognition technology. More particularly, the invention relates to systems and methods for tuning and testing of a speech recognition system.

2. Description of the Related Technology

Speech recognition generally pertains to technology for converting voice data to text data. Typically, in speech recognition systems a speech recognition engine analyzes speech in the form of audio data and converts it to a digital representation of the speech. One area of application of speech recognition involves receiving spoken words as audio input, decoding the audio input into a textual representation of the spoken words, and interpreting the textual representation to execute instructions or to handle the textual representation in some desired manner.

One example of a speech recognition application is an automatic call handling system for a pizza delivery service. The call handling system includes a speech recognition system that receives audio input from a customer placing an order for delivery. Typically, the speech recognition application prompts the customer for responses appropriate to the context of the application. For example, the speech recognition system may be configured to ask: "Would you like a small, medium, or large pizza?" The customer then provides an audio input such as "large," which the speech recognition system decodes into a textual description, namely "large." The speech recognition system may also be configured to interpret the text "large" as a command to prompt the user with a menu list corresponding to toppings options for a large pizza.

The performance quality of a speech recognition system depends on, among other things, the quality of its acoustic model and the appropriateness of its dictionary. Since an acoustic model is based on statistics, the larger the amount of correct data supplied to the model's training, the more accurate the model is likely be in recognizing speech patterns. Moreover, the training of an acoustic model typically requires accurate word and noise transcriptions and actual speech data. However, in practice, it is often difficult to produce accurate transcriptions of the speech data.

A typical dictionary provides one or more pronunciations for a given word, syllable, phoneme, etc. If the pronunciations accurately reflect how a word is pronounced, then the acoustic model has a better chance of recognizing the speech input. However, if the pronunciations are poor they can impair the acoustic model's ability to recognize words.

Improving the performance of a speech recognition application by improving the acoustic model or the dictionary is usually performed while the application is off-line, i.e., not in actual use in the field. Improvements may be attempted by adding to and/or modifying the pronunciations in the dictionary, and/or by providing transcriptions which often require a long and labor-intensive process. In some cases, this process can take anywhere from a week to months.

Speech recognition applications such as the one described above benefit from testing for satisfactory performance not only at the development stage but also during actual use of the application in the field. Moreover, the speech recognition system can benefit from in-field adjustments ("tuning") to enhance its accuracy. However, known speech recognition systems do not incorporate a convenient testing facility or a tool for periodic, incremental adjustments. Thus, there is a need in the industry for systems and methods that facilitate the tuning and testing of speech recognition systems. The systems and methods described herein address this need.

SUMMARY OF CERTAIN INVENTIVE ASPECTS

The systems and methods of the present invention have several aspects, no single one of which is solely responsible for their desirable attributes. Without limiting the scope of the invention as expressed by the claims which follow, its more prominent features will now be discussed briefly One embodiment of the invention is directed to a method of tuning a speech recognizer. The method comprises playing a selected portion of a digital audio data file, and creating and/or modifying a transcript of the selected audio portion. The method can further comprise displaying information associated with a decode of the selected audio portion. In some embodiments, the method includes determining, based at least in part on the transcript and the information associated with the decode, a modification of the speech recognizer to improve its performance.

Another embodiment of the invention concerns a method of testing a speech recognizer. The method comprises receiving a selected portion of a digital audio data file, receiving a grammar having a set of responses expected to occur in the selected portion, and based at least in part on the selected portion and the grammar, producing a decode result of the selected portion. In some embodiments, the method further comprises receiving a transcript of the selected portion, and scoring the decode result based at least in part on the transcript.

Yet other embodiments of the invention relate to a system for facilitating the tuning of a speech recognizer. The system comprises a playback module configured to play selected portions of a digital audio data file, an editor module configured to allow creation and modification of a transcript of the selected portions, and a detail viewing module configured to display information associated with a decoding of the selected portions by the speech recognizer.

Some embodiments of the invention are directed to a system for testing a speech recognizer. The system comprises an audio recorder module for receiving digital audio input. The system can further include a grammar editor module configured to access and allow modification of a grammar, the grammar comprising words, phrases, or phonemes expected to appear in the audio input. The system can also have a speech recognition engine configured to output a recognition result based on the audio input and the accessed grammar. The system, in other embodiments, also includes a scoring module configured to score the recognition result based at least in part on a user-defined transcript of the audio input and the recognition result.

Yet another embodiment of the invention concerns a speech recognizer. The speech recognizer can include a speech recognition engine configured to generate a decoding of a digital audio data file, a tester module in data communication with the speech recognition engine, and a tuner module in data communication with the tester module. The tuner module is configured to output a transcript of at least a portion of the audio data file, and the tester module is configured to score the decoding based at least in part on the transcript.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

DETAILED DESCRIPTION OF CERTAIN EMBODIMENTS

The following detailed description of certain embodiments presents various descriptions of specific embodiments of the present invention. However, the present invention can be embodied in a multitude of different ways. In this description, reference is made to the drawings wherein like parts are designated with like numerals throughout.

Embodiments of the invention described herein concern systems and methods that facilitate the tuning and testing of speech recognition applications. In some embodiments, audio data collected from field deployment of a speech recognition application can be used to improve the accuracy of the application by, for example, adjusting a grammar used to evaluate the audio input. In other embodiments, field audio data can be tested against a newly created grammar to evaluate the performance of the speech recognition application using the new grammar. As used here, the term "performance" refers to the ability of the speech application to carry out the purpose or tasks of the application, rather than its ability to decode accurately speech audio. In other embodiments, the systems and methods described here allow the testing of a new pronunciation using an application deployed in the field, even while the speech recognition application is in use. The pronunciation test can include testing of the grammar and dictionary to ensure that pronunciations substantially match the actual utterances of users of the application. In some embodiments, the systems and methods of the invention allow monitoring of particular audio inputs and the responses of the speech recognition application to those inputs. These and other embodiments are described in detail below.

Figure 1:
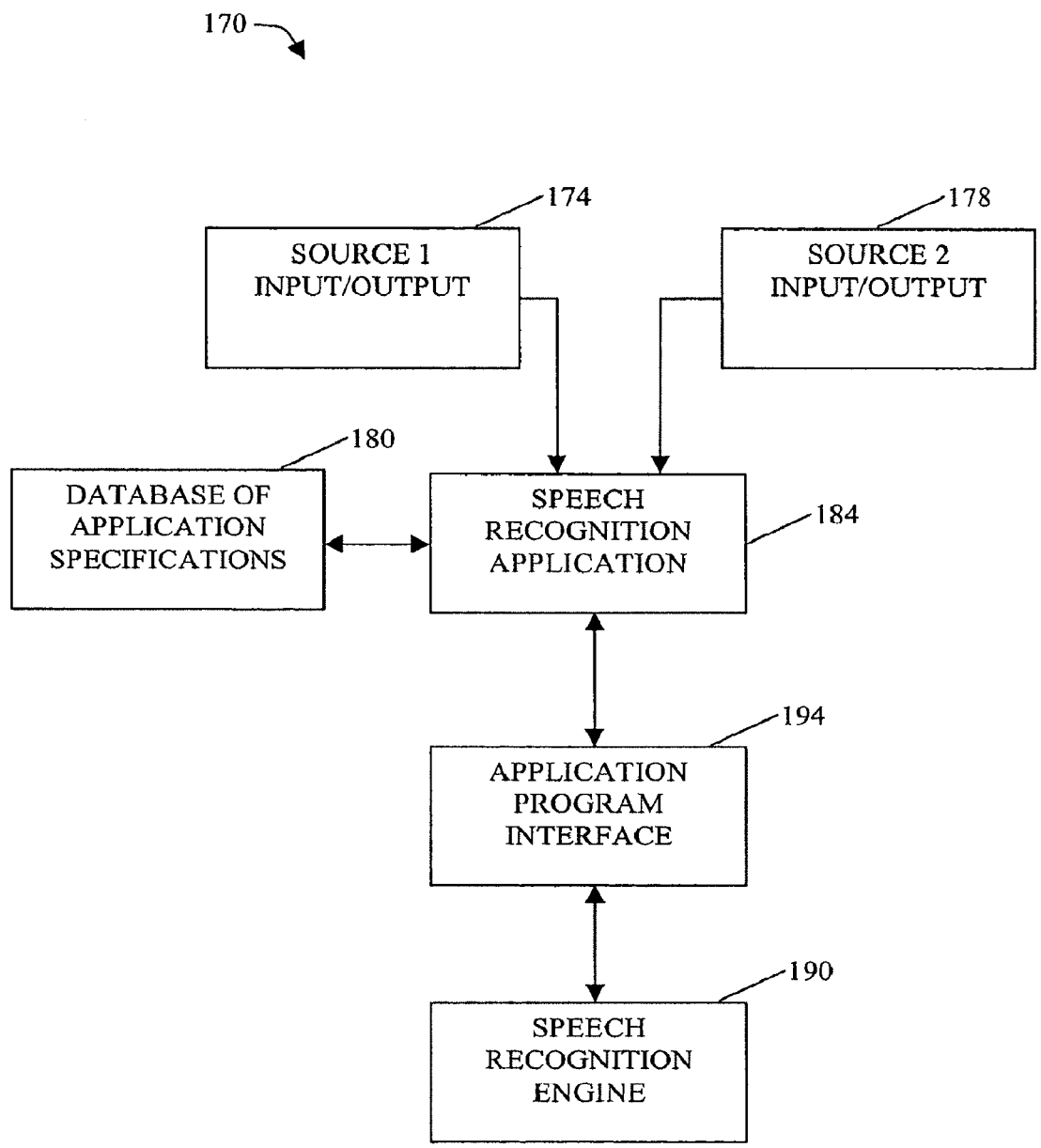
FIG. 1 is a top-level diagram of an exemplary speech recognition system in which a tuner and/or tester according to the invention can be implemented.

Referring now to the figures, FIG. 1 is a top-level diagram of an exemplary embodiment of a speech recognition system 170 in which a tuner module and/or a tester module in accordance with embodiments of the invention can cooperate with a speech recognition engine 190. The speech recognition system 170 can include a speech recognition application 184, which may be one or more modules that customize the speech recognition system 170 for a particular application, e.g., a pizza delivery service or a car rental business. In some embodiments, the application 184 is bundled with the speech recognition system 170. In other embodiments, the application 184 is developed and provided separately from the speech recognition system 170. In certain embodiments, the tuner and/or tester modules (shown in FIG. 2) are incorporated into the speech recognition system 170.

The speech recognition system 170 can include input/output audio sources, shown in FIG. 1 as a source 1 input/output 174 and a source 2 input/output 178. The speech recognition system 170 may have one or a multiplicity of input/output audio sources. In addition, an audio source may be of various types, e.g., a personal computer (PC) audio source card, a public switched telephone network (PSTN), integrated services digital network (ISDN), fiber distributed data interface (FDDI), or other audio input/output source. Some embodiments of the speech recognition system 170 also include a database of application specifications 180 for storing, for example, grammar, concept, phrase format, vocabulary, and decode information. In some embodiments, modules, information and other data items that the tuner and/or tester modules utilize can be stored within the database of application specifications 180. Alternatively, the tuner and/or tester modules may be stored in other storage devices such as electronic memory devices, hard disks, floppy disks, compact disc read-only-memory, digital video discs, or the like.

The speech recognition engine 190 processes spoken input (e.g., "speech audio," "audio data," "utterances," or other acoustic phenomena) and translates it into a form that the system 170 understands. The output of the speech recognition engine 190 is referred to as a decode result or a recognition result 580 (see FIG. 6). The application 184 can be configured to interpret the decode result as a command or to handle it in some way, such as storing the information for subsequent processing. The speech recognition system 170 can additionally include a speech recognition engine application program interface (API) 194, or "speech port API," to enable programmers or users to interact with the speech recognition engine 190.

Figure 4:
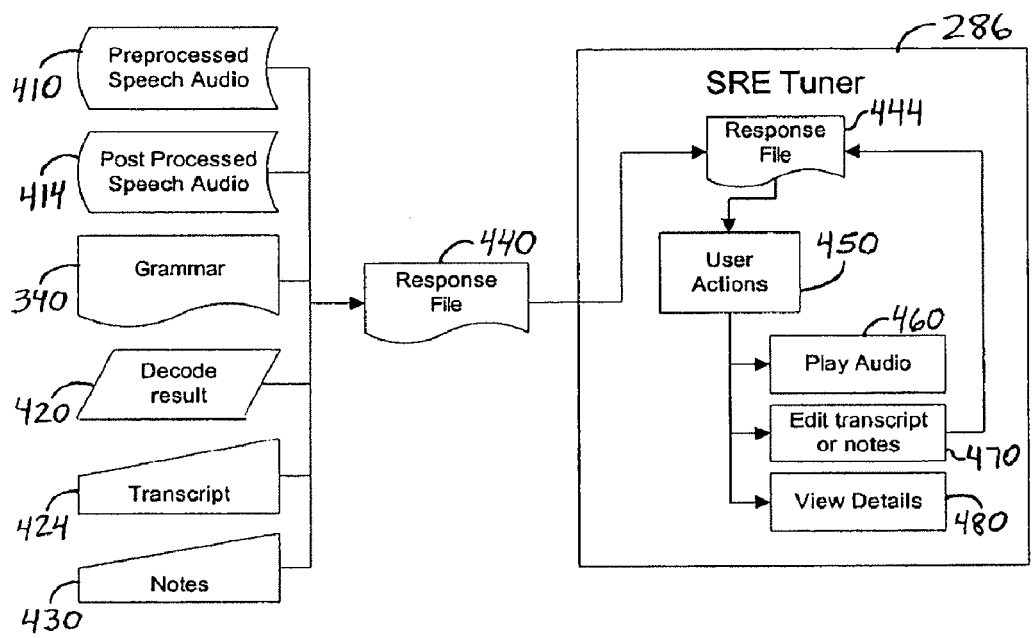
FIG. 4 is a functional block diagram of an exemplary tuner module that can be used with the speech recognition system shown in FIG. 2.

In one embodiment of the system 170, the speech recognition engine 190 provides information for a response file 440 (see FIG. 4). In some embodiments, the response file 440 contains all the data necessary to recreate the input-response events corresponding to the input speech file. Hence, to use and test the data of the response file 440 against new speech recognition applications it is sufficient to provide an application that can read the format of the response file 440. The response file 440 is described further below with reference to FIG. 4.

The various components of the system 170 may include software modules stored and/or executing on one or more computing devices. The modules can comprise various subroutines, procedures, definitional statements, and macros. The modules are typically separately compiled and linked into a single executable program. The following description of modules employed in the system 170 is used for convenience to describe their functionality. Thus, the processes associated with these modules may be arbitrarily redistributed to one of the other modules, combined together in a single module, or made available in a shareable dynamic link library, for example.

The software modules may be written in any programming language, such as C, C++, BASIC, Pascal, Java, or Fortran, and may be executed by any appropriate operating system. Commercially available compilers create executable code from computer programs written in C, C++, BASIC, Pascal, Java, or Fortran. One or more of the components of the system 170 execute several of the processes described below. These process can be implemented in software modules, firmware, and/or hardware.

The term "computer-readable medium" as used herein refers to any medium that participates in providing instructions to a microprocessor for execution. Such a medium may take many forms, including but not limited to, non-volatile media, volatile media, and transmission media. Non-volatile media includes storage devices such as optical or magnetic disks. Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a compact disc read-only memory device ("CD-ROM"), any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to computing devices on which the system 170 is implemented.

Figure 2:
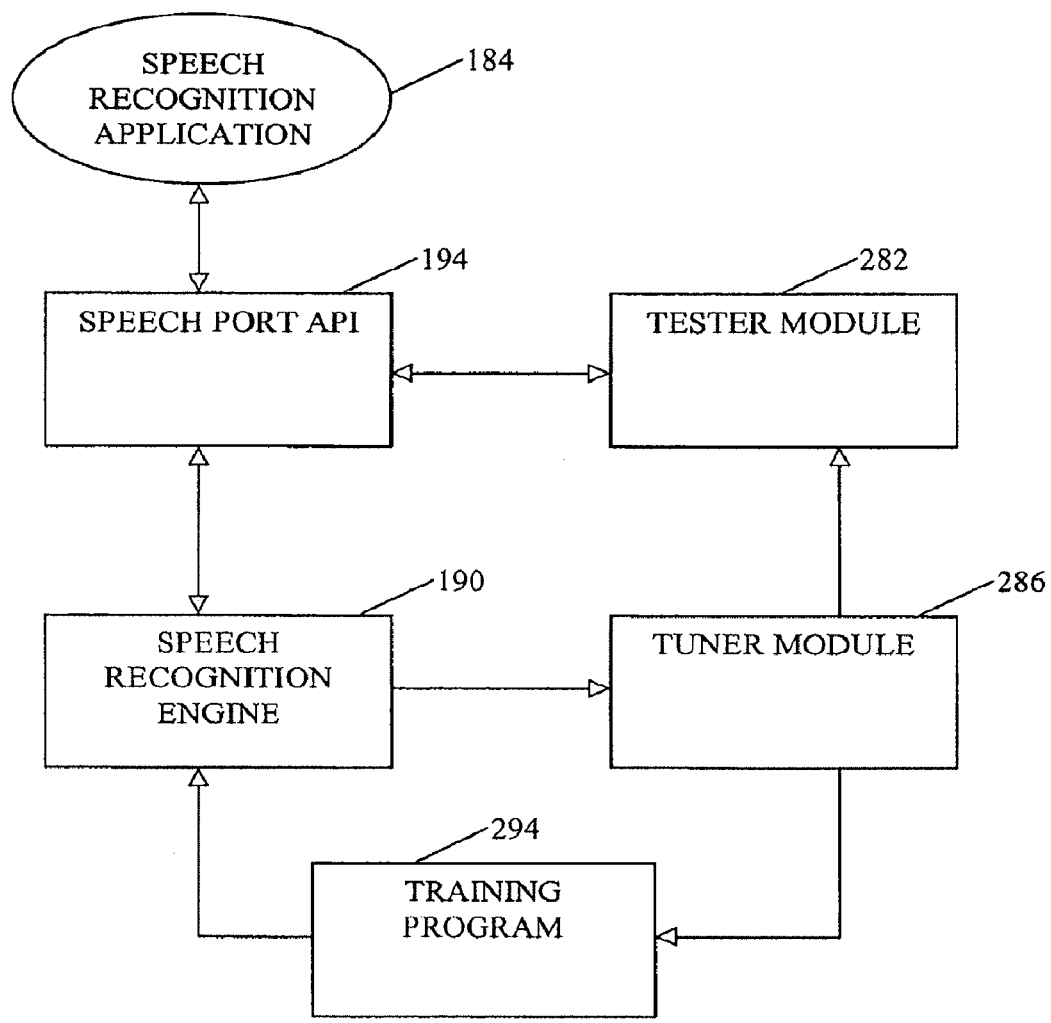
FIG. 2 is a functional block diagram of an exemplary speech recognition system having a tuner and tester that cooperate with a speech recognition engine.

FIG. 2 is a diagram of an exemplary embodiment of the speech recognition engine 190 configured to cooperate with a tester module 282 and a tuner module 286. The application 184 is shown in FIG. 2 as an oval to illustrate that in this embodiment the application 184 is not integrated with the speech recognition engine 190 but is developed and provided separately from the system 170. The speech port API 194 can be configured to communicate with the speech recognition engine 190, e.g., for communicating a request to decode audio data and for receiving an answer to the decoded request. In this embodiment, the speech port API 194 serves as an interface for the user-developed application 184 to interact with the speech recognition engine 190. The speech port API 194 also can be configured to communicate with the tester module 282, e.g., for invoking the speech recognition engine 190 on a recognition session.

The tuner module 286 can be configured to receive information from the speech recognition engine 190 regarding a response file 440 (see FIG. 4). In some embodiments, the tuner 286 interacts with a training program module 294 for, among other things, communicating transcribed audio data to a training program 294. The training program 294 can also be configured to communicate with the speech recognition engine 190 to transfer a new acoustic model information to the speech recognition engine 190, for example. The word tester module 282 can be configured to interact with the tuner module 286 for, among other things, receiving from the tuner module 286 information regarding a recognition session. The tester module 282 can be configured to allow a user to test new grammars and pronunciations.

Operation of the system illustrated in FIG. 2 is further described below with reference to certain embodiments of the tester module 282 and tuner module 286 shown in FIGS. 4 through 9

Figure 3:
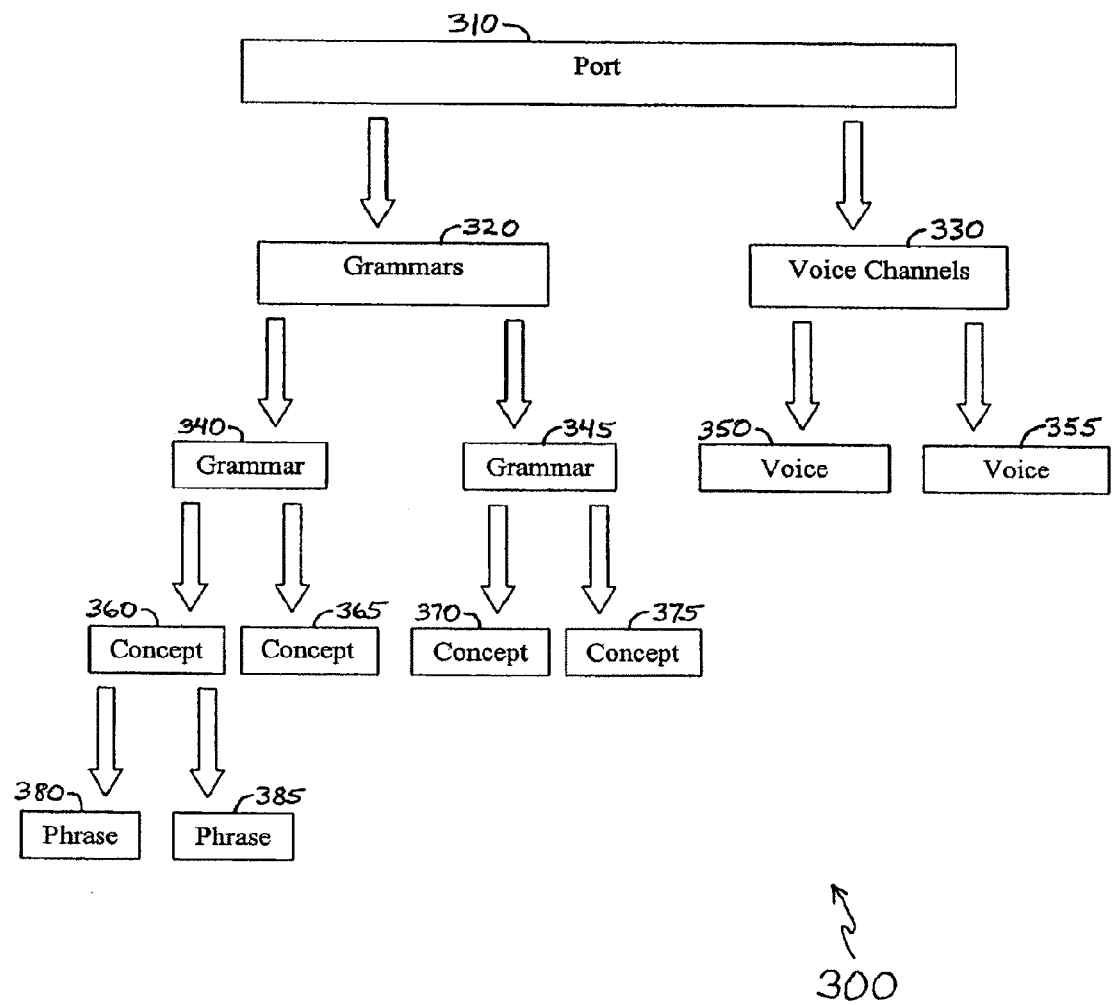
FIG. 3 is a block diagram of an exemplary embodiment of a speech port in communication with grammars and voice channels for use in a speech recognition system.

FIG. 3 is a diagram illustrating one example of a speech port 310 including grammars 320 and voice channels 330, as well as the relationship between grammars, concepts, and phrases in the speech recognition system 170. As shown in FIG. 3, the application 184 can include a speech port 310 in communication with one or more grammars 340 and 345, one or more voice channels 350 and 355, one or more concepts 360, 365, 370, and 375 within each grammar, and one or more phrases 380 and 385 within each concept. The speech port 310 is one example of an application interface that the application 184 may be configured to create in order to communicate with the speech recognition engine 190. Of course, in addition to the example of FIG. 3, the application 184 may create many others speech port APIs 310 depending on the particular desired implementation of the speech port 310 for the many particular speech recognition applications. Further discussion of various embodiments of the speech port API 310 is provided in related application Ser. No. 10/317,837, entitled "SPEECH RECOGNITION SYSTEM HAVING AN APPLICATION PROGRAM INTERFACE," filed Dec. 10, 2002.

In some embodiments, the speech port 310 allows the application 184 to apply any grammar to any voice channel, providing flexibility in processing the audio data and converting it to the corresponding textual representation. While the example in FIG. 3 shows two instances of grammars, voice channels and phrases, and four instances of concepts, these numbers are for illustrative purposes only. The speech port API 194 can be configured to allow for as few as one of these elements, as well as a multiplicity of these elements, limited only by practical limitations such as storage space and processing speed and efficiency.

FIG. 4 is functional block diagram of a tuner module 286 in accordance with one embodiment of the invention. The tuner module 286 can include a user interface 450 that provides communication with a play audio module 460, an editing module 470, and a detail viewing module 480. Typically the tuner module 286 is configured to receive instructions for processing a response file 440, which may include information associated with, but not limited to, preprocessed speech audio 410, post-processed speech audio 414, grammar 340, decode result 420, transcript 424, and notes 430. In some embodiments, the tuner module 286 is configured to allow modification of the response file 440 and, thereby, creation of a new response file 444.

The preprocessed speech audio 410 can include audio data before it has been adjusted for various factors including, but not limited to, noise level and background noise. The post-processed speech audio 414 can include audio data after it has been modified for input to the speech recognition engine 190. The post-processed speech 414 can be the result of modifying the preprocessed speech audio 410, for example, by increasing the speech volume and decreasing the background noise volume.

The grammar 340 includes a set of expected responses for a given response file generated from a specific application of the system 170. The responses can be in the form of words and/or pronunciations. The decode result 420, as previously mentioned, can include information associated with the output of the speech recognition engine 190 from its processing of the audio input. In some embodiments, the decode result of the speech recognition engine 190 includes the prompts employed by the recognition application 184.

The transcript 424 can be a literal transcription of the post-processed speech audio 414. The transcript 424 can be, but is not limited to, the textual representation of the actual words occurring, in order, in the audio input. Additionally, in some embodiments, the transcript 424 can include markers indicating noise, timing, acoustic word alignments, etc. (see FIG. 9). The transcript 424 can be used for, among other things, building a new acoustic model, scoring output from the speech recognition engine 190, building a grammar 340, and providing a textual record of the acoustic events, namely the speech audio received in response to prompts. In the context of the speech recognition system 170, the transcript 424 can be considered errorless relative to decode result provided by the speech recognition 190, which may have errors.

The notes 430 can include any annotations provided by a transcriber and are preferably linked to a particular transcript 424. The notes 430 can include information about one or more acoustic events, including any piece of information that a transcriber deems desirable to save with the transcript 424. The notes 430 can be used to, for example, mark anomalies in the speech recognition process—the anomalies being relevant to a particular sequence of acoustic events. In some cases, if the user notices a consistent discrepancy between the transcript 424 and the detail, the user may make a note of the discrepancy in the notes 430. The user can also save these modifications to the response file 444.

The user interface 450 is preferably, but not necessarily, a graphical user interface having elements such as a screen with icons, input fields, menus, etc. (see FIG. 9). The play audio module 460 is configured to play back the preprocessed speech audio 410 and/or post-processed speech audio 414. The editing module 470 allows access to and modification of the transcript 424 and/or the notes 430. In some embodiments, the editing module 470 is a text editor that displays the text of the transcript 424 and/or notes 430. The editing module 470 additionally can be configured to receive input for modifying the transcript 424 and/or notes 430 and store the modifications in a modified response file 444.

An exemplary use of the tuner module 286 may involve loading a response file 440 into the tuner 286, playing a portion of the audio data 414, creating a transcript 424 of the audio data played back, and analyzing the transcript, grammar 340 and decode result 420 to determine potential modifications to the system 170 for improving its performance. The segment, or portion, of the decode result (along with any other technical or administrative information associate therewith) corresponding to the portion of the speech audio selected by the user is referred to here as a "detail." It should be noted, that the actual audio 414 from the post-processed speech audio 414 may or may not be different from the information captured by the detail. From an analysis of the transcript 424 and the detail, a user can determine whether it would be desirable to modify any aspect of the system 170 to improve its performance. For example, the user may determine that the transcript 424 and detail show that a modification in the grammar, pronunciation, vocabulary, etc., may be useful for enhancing the performance and/or accuracy of the application 184.

Figure 5:
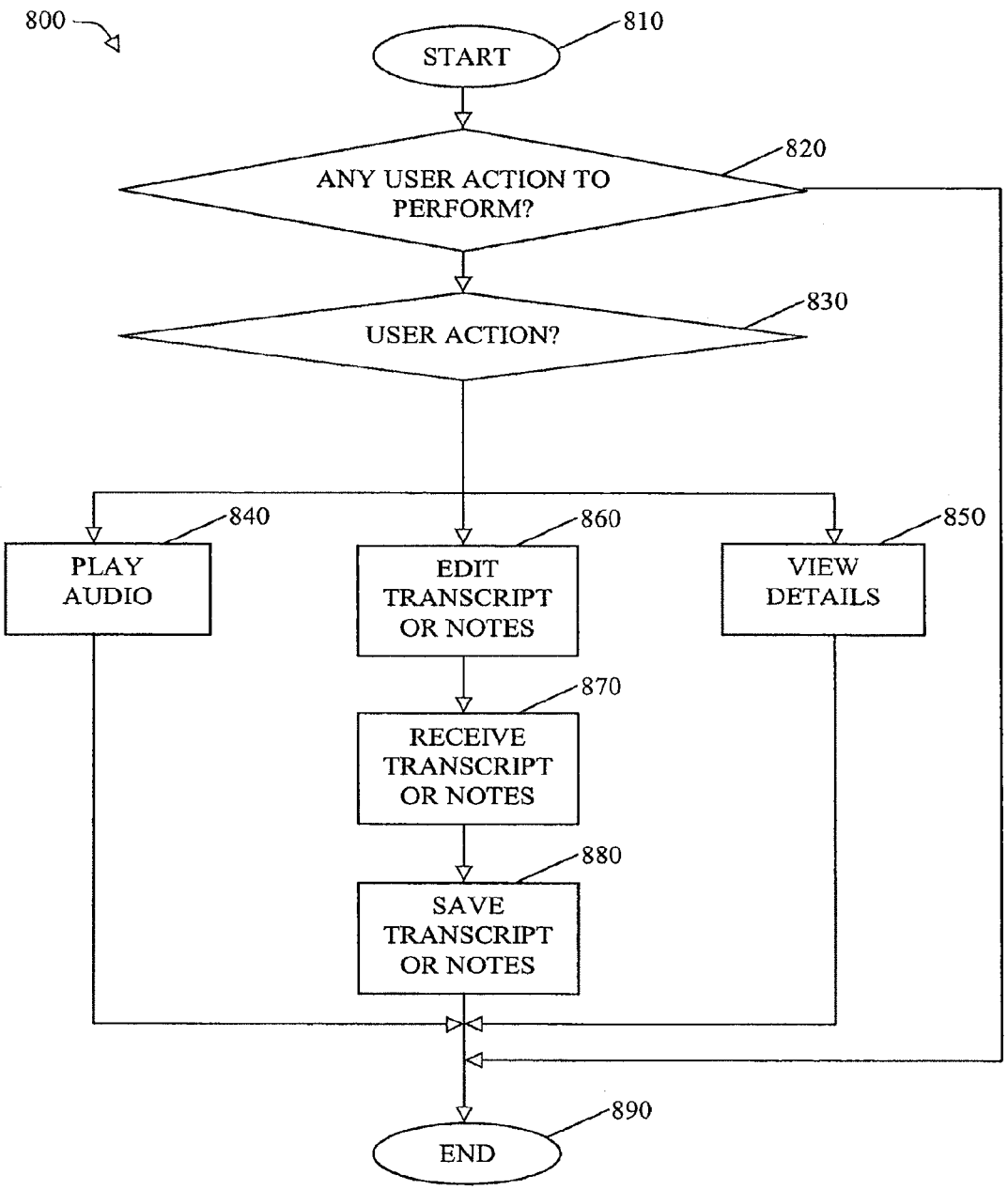
FIG. 5 is a flowchart illustrating an exemplary process of tuning a speech recognition system with embodiments of the tuner module shown in FIG. 4.

FIG. 5 illustrates an exemplary process 800 that can be utilized in conjunction with the tuner module 286 shown in FIG. 4. Depending on the embodiment of the process 800, states may be added, removed, or merged, and the sequence of the states rearranged. The process 800 starts at a state 810 wherein a user accesses a user interface 450 (see FIGS. 4 and 9) that the tuner module 286 provides. At a decision state 820, the tuner module 286 determines whether the user has selected an action to perform on the response file 440. If the user indicates an end of a tuning session, by for example selecting an "exit" button, the process 800 moves to the end state 890.

However, if the user selects an action, the tuner module 286 determines whether the user desires to access the play audio module 460, the editing module 470, or the detail viewing module 480. If the user selects the play audio module 460, at a state 840 the tuner module 286 allows the user to play back the preprocessed speech audio 410 and/or the post-processed speech audio 414.

If at a state 860 the user selects the editing module 470, the process 800 proceeds to a state 870 wherein the editing module 470 accesses the transcript 424 and/or notes 430 of the response file 440. The editing module 470 allows the user to view and/or edit the transcript 424 and/or notes 430. At a state 880 the editing module 470 saves the modified transcript 424 and/or notes 430 to a modified response file 444. In one embodiment, the editing module 470 is configured to allow use of labels for various noise events, such as "noise," "cough," "laugh," "breath," "hum," "uh" and other background acoustical phenomena. In other embodiments, if the speech recognition engine 190 recognizes the correct words in the speech audio, the user can select one button to automatically transcribe the input audio.

At a state 850, the user may select the detail viewing module 480. In this case, the detail viewing module 480 can be configured to display a user-selected segment of the decode result 420. In some embodiments, the detail viewing module 480 displays certain information contained in the response file 440. These details can include, but are not limited to the prompt, decode result, grammar used to decode a particular portion of a call, response of the application 184 to the portion of the call, time at which a particular audio input occurred, and/or the length of the audio input. The detail viewing module 480 can additionally display administration information such as unique identification and other information for a given audio input.

The process 800 of FIG. 5 shows that after a user action 840, 850, or 860, the process 800 moves to the end state 890. However, in other embodiments, the process 800 does not end after a user action, but rather it proceeds to the decision state 830 to determine whether the user selects a user action again. For example, a user may select the play audio module 460 at the state 840 to play a segment of preprocessed speech 410, then select the play audio module 460 again to play a different segment of the preprocessed speech 410. By way of another example, the user may select the editing module 470 at the state 860 to edit one part of the transcript 424, then select the detail viewing module 480 to view details of the decode result 420, and again select the editing module 470 at the state 860 to edit a part of the transcript 424 associated with the detail of the decoded result 420 previously viewed at the state 850. In other words, in some embodiments the process 800 can be configured to allow the user to select any of the actions 840, 850, or 860 in no specific order and without any predetermined or limited number of times before the process 800 ends at the state 890.

Thus, in some embodiments, the tuner module 286 allows a user to listen to and transcribe the audio input, as well as to ensure that noise labels are appropriate for the system 170. One output of the tuner module 286 is a transcript of an audio file, which can contain all the words and noise events received by the system 170, with information about the match between the recognition system and the actual words spoken as captured by the audio input. The data can then be used, for example, to train new acoustic models and to tune other parameters in the recognition system 170.

In one embodiment of the process 800, a user can employ the tuner 28 to listen to, transcribe, and analyze a selected portion of an audio file to determine what modifications can improve the performance of the system 170. For example, a user can select a portion of an interaction between the system 170 and a customer, namely a portion of the audio file recorded as a customer interacts with the application 184. For convenience, such audio portions are referred to here as "events." Based on the audio heard, the transcription of the audio segment, and data displayed from the decode of the audio by the speech recognition engine 190, the user can make determinations as to whether, for example, changing the grammar, prompts, pronunciations, call flow design, etc. may improve the performance of the system 170. By way of example, in some cases, the grammar may have been designed such that the pronunciation of an expected response does not match the caller's actual pronunciation, or such that an intuitive response by the customer is not captured by the concepts included in the grammar. Hence, after analysis of the same segment of a call across multiple calls might reveal that the grammar should be changed to better capture the customer's response to the corresponding prompt. This determination may result, for example, from noticing that the confidence scores returned by the speech recognition engine are consistently low for that segment.

As depicted in FIG. 2, the tuner module 286 can be configured to communicate with the tester module 282. In certain embodiments, the tester module 282 and the tuner module 286 cooperate to allow a user to improve the performance of the system 170. For example, in some embodiments the tuner module 286 forwards to the tester module 286 the transcript 424, which the tester module 286 can then use to perform a test of modifications made to the system 170.

Figure 6:
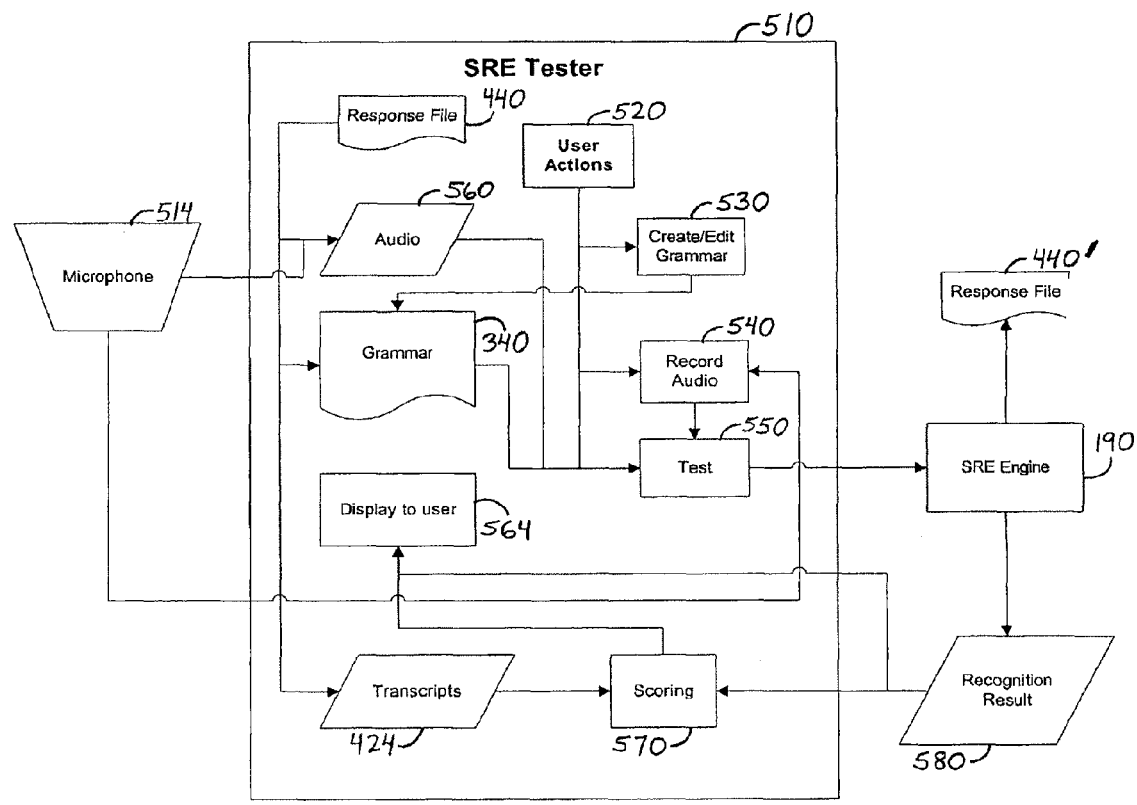
FIG. 6 is a functional block diagram of an exemplary tester module that can be used with the speech recognition system shown in FIG. 2.

FIG. 6 is a functional block diagram of an exemplary tester module 510. The tester module 510 can include a user interface 520 to receive input from and provide output to a user. Preferably the user interface 520 is a graphical user interface having a screen with elements such as icons, selection buttons, input fields, etc. The tester module 510 can include a grammar editor module 530 for editing or creating a grammar 340 associated with a response file 440. The tester module 510 can also include a record audio module 540 to receive audio input from, for example, a microphone 514.

The tester module 510 can further have a test module 550 that receives (i) audio data 560 associated with the response file 440, or (ii) audio data generated by the record audio module 540, and/or (iii) the grammar 340. The test module 550 processes the audio data and grammar and forwards them to the speech recognition engine 190 for decoding. The speech recognition engine 190 then produces a new response file 440'. In some embodiments, the tester module 510 also includes a scoring module 570 for processing the recognition results 580 of the speech recognition engine 190 and a transcript 424 associated with the response file 440. The tester module 510 can also have a display module 564 that displays the results of the scoring module 570 to the user. In some embodiments, the display module 546 is incorporated into the user interface 520. The operation of the tester module 510 is described below with reference to FIGS. 7 and 8.

In one embodiment, the tester module 510 provides four functions. It allows the adding of new phonetic transcriptions for words, either for new words, or new pronunciations for existing words. The tester module 510 can display the grammar 340, either preloaded or user-specified, and allows the user to modify the grammar by adding, deleting, or editing existing words and pronunciations. The tester module 510 can show the results when the system 170 is tested against new grammars and/or words. Finally, the tester module 510 can receive the response file 440 from the tuner module 286, as well as record a new audio file for testing directly in the system. These functions allow the user to quickly target problem words and/or phrases, and design and test solutions against audio data collected in field deployment of the system 170.

The tester module 510 allows a user to test new grammars and pronunciations online, without needing to retrain or retest the entire recognition engine with new pronunciations. The tester module 510 can receive audio data 560 and grammar 340 from the tuner module 286. The tester module 510 also allows the user to record audio from a microphone 514, and either test that audio against the grammar, or specify a new grammar. These two methods allow the user to tightly focus pronunciations and grammars on particular problem words and/or phrases whether spoken by actual users that the recognition system could not handle, or problems identified from prior knowledge.

In some embodiments, the tester module 510 includes an integrated suite of tools designed to evaluate, modify, and reevaluate the performance of a speech application 184 on several parameters. The microphone 514 can be used to record audio data needed for testing against a grammar 340. In some embodiments, the response file 440 is a logical organization of elements necessary for testing. Hence, in one embodiment a response file 440 includes audio data 560, grammar 340 that the speech recognition engine 190 used to decode the audio data 560, and a transcript 424 of the audio. Another embodiment of the response file 440 may have only the audio data 560. Yet other embodiments of the response file 440 may have audio data 560, transcript 424, and notes 430. The response file 440 can be stored on a permanent storage medium, or represented only in volatile memory, or some combination of the two.

The audio data 560 can be used for testing the system 170. In some embodiments, the source of the audio 560 is independent from the tester module 282. The grammar 340 can be a list of elements that the tester module 510 tests audio files against. The grammar 340 can consist of sound representations (called phones or phonemes), either as a single phoneme, a string of phonemes, or mapped into higher-level abstractions such as syllables, words, phrases, or any other arbitrary mapping.

In some embodiments, the tester module 510 includes a display module 564 that displays the recognition results 580 produced by the speech recognition engine 190, as well as the and scoring information produced by the scoring module 570, after the test module 550 conducts a test.

As previously mentioned, a transcript 424 can be a user-produced mapping of the kind described with respect to grammar 340. The transcript 424 differs from the recognition result 580 in that the transcript 424 includes a mapping of the acoustic events actually occurring in the audio data 560, such as noise or speech, whereas the recognition result 580 represent the speech recognition engine 190 processing of the audio data 560. The transcript 424 is usually, but not always, the literal textual representation of actual words appearing in an acoustic segment (i.e., audio input) in the order found in the segment. Additionally, a transcript 424 may include markers indicating noise, timing, acoustic to word alignments, etc. A transcript 424 can be used in the training process to build new acoustic models, score the recognition result 580, build the grammars necessary for speech recognition, and provide textual records of the acoustic events. The transcript 424 is considered errorless, in contrast to the recognition result 580 which may have errors.

In some embodiments, the tester module 510 is configured to allow a user to create or edit a grammar 340, record audio, and perform a test of the system 170 employing the edited grammar 340. A record audio module 540 allows the user to record audio data using a microphone 514 or other input device to capture audio data to use for testing. A test module 550 can be configured to initiate a testing cycle, namely processing and sending audio data and grammars to the speech recognition engine 190. In some embodiments, a test is complete when the speech recognition engine 190 responds with a recognition result 580 and the scoring module 570 scores the recognition result 580. The scoring module 570 scores the recognition result 580, which helps to evaluate the speech application 184. If a transcript 424 is available, the scoring module 570 generates, among other measurements, accuracy measures. Even if a transcript 424 is not available, the scoring module 570 generates as many other measurements as possible including, but not limited to, decode time, number of grammar mappings returned, etc. Hence, in certain circumstances, the recognition result 580 is a compilation of results from running the test module 550 with the speech recognition engine 190. The recognition result 580 can include, but is not limited to, mappings in the grammar found in the audio, confidence measures for the mappings, and decode times, etc. (see FIG. 9).

An exemplary use of the tester module 510 may involve accessing audio data 560 and grammar 340 and testing the ability of the application 184 to process correctly the audio data 560 with the grammars 340. A user may also provide a transcript 424 of the audio data 560. The user can select the grammar editor module 530 to modify, e.g., create or edit, the grammar 340 to test its effectiveness with the audio data 560 and the speech recognition engine 190.

In single test mode, the user can supply a single grammar 340 and a single audio data 560 recording. In batch test mode, the user can supply one or more grammars 340, and one or more audio data 560 recordings. In both modes, the user can select execution of tests by the test module 550, which sends the audio data 560 and grammar 340, one pair at a time, to the speech recognition engine 190. The speech recognition engine 190 decodes the audio data 560 and packages the answer for each audio-grammar pair as a recognition result 580, which can be permanently stored for later viewing. The speech recognition engine 190 can also forward the recognition result 580 to the scoring module 570. The scoring module 570 evaluates the recognition result 580 for performance measurements including, but not limited to, decode time, acoustic model used, number of items found in the speech, etc.

If a transcript 242 is available, the scoring module 570 can also generate statistics on the accuracy of the recognition result 580 with respect to the transcript 242. The statistics may include, but are not limited to, word error rate, concept error rate, average confidence scores for correct and incorrect results, etc. The recognition result 580 and scoring statistics can be displayed to the user via the display module 564.

In single test mode, the recognition result 580 and scoring results displayed are only relevant for the single audio-grammar pair. In batch test mode, the results can be displayed aggregated across all audio-grammar pairs in the batch test; however, in other embodiments, individual results can be made available. The user can again execute the test, or change the audio data 560 and/or grammar 340 and retest, receiving a new batch of results and statistics.

Figure 7:
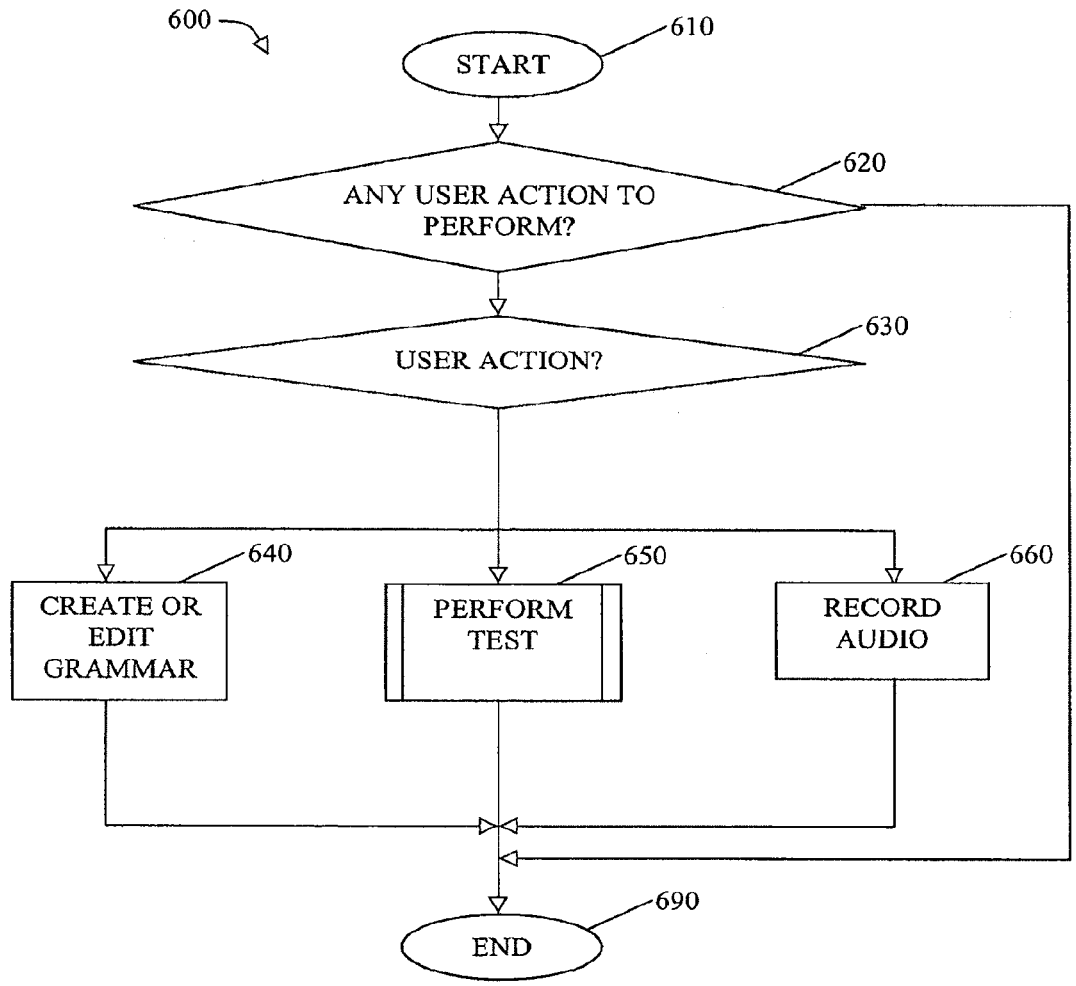
FIG. 7 is a flowchart illustrating an exemplary process of testing a speech recognition system with embodiments of the tester module shown in FIG. 6.

FIG. 7 illustrates an exemplary process 600 that can be used in conjunction with the tester module 510 shown in FIG. 6. Depending on the embodiment of the process 600, states may be added, removed, or merged, and the sequence of the states rearranged. The process 600 starts at a state 610 wherein a user accesses a user interface 520 (see FIG. 6) provided with the tester module 510. At a decision state 620, the tester module 510 determines whether it has received an indication of a user selection of any one of the grammar editor module 530, record audio module 540, or test module 550. If the tester module 510 does not receive an indication of a selection, or the user indicates selection of an "exit" function, the process 600 ends at a state 690.

However, if the tester module 510 receives an indication of a selection of a user action, i.e., selection of one of the modules 530, 540, or 550, at a decision state 630 the tester module 510 determines which module is selected. If the user selects the grammar editor module 530, the process 600 proceeds to a state 640 wherein the tester module 510 allows the user to create or edit a grammar 340. In one embodiment, the grammar editor module 530 accesses the grammar 340 associated with the response file 440 and displays it to the user. The user can then employ the grammar editor module 530 to modify the grammar 340. The grammar editor module 530 can be configured to store the modifications in a modified response file 440.

If the tester module 510 receives an indication that the user selects the test module 550, the process 600 moves to a state 650 wherein the test module 550 can process audio data 560 and grammar 340 to perform a test, as will be further described with reference to the process 650 shown in FIG. 8. If the tester module 510 receives an indication of a selection of the record audio module 540, the process 600 proceeds to a state 670 wherein the record audio module 540 allows the user to provide audio data input. In some embodiments, the user can employ a microphone 514 to provide the audio data input to the record audio module 540.

The process 600 of FIG. 7 shows that after a user action 640, 650, or 660, the process 600 moves to the end state 690. However, in other embodiments, the process 600 does not end after a user action, but rather it proceeds to the decision state 630 to determine whether the user selects a user action again. For example, a user may select the grammar editor module 530 at the state 640 to create a grammar 340, then select the record audio module 540 at the state 660 to provide audio data, and next select the test module 550 at the state 650 to perform a test. Thus, in other words, in some embodiments the process 600 can be configured to allow the user to select any of the actions 640, 650, or 660 in no specific order and without any predetermined or limited number of times before the process 600 ends at the state 690.

Figure 8:
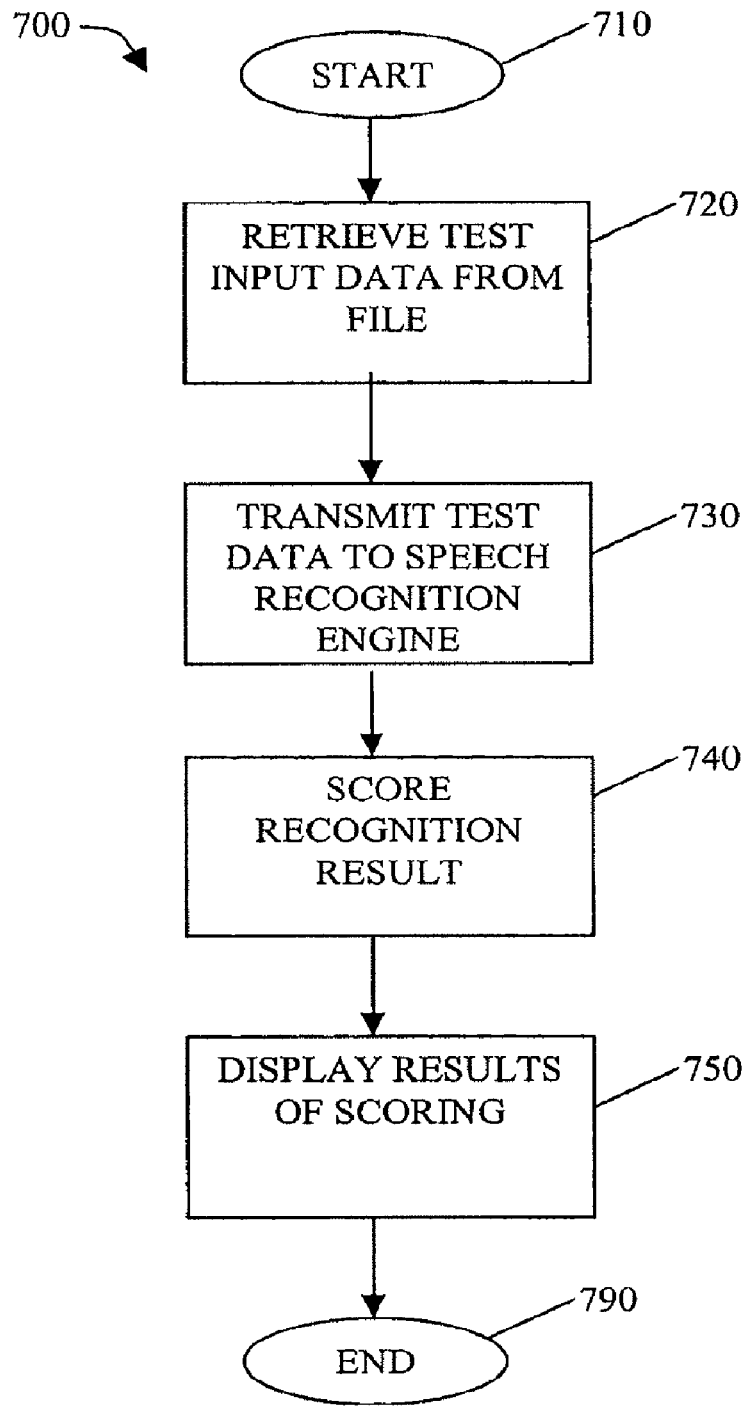
FIG. 8 is a flowchart illustrating an exemplary process of performing a test of a speech recognition system utilizing audio data, a grammar, and a transcript. The test can be performed in conjunction with the process shown in FIG. 7.

FIG. 8 illustrates an exemplary process 700 of performing a test. The process 700 can be used in conjunction with the process of FIG. 7. Depending on the embodiment of the process 700, states may be added, removed, or merged, and the sequence of the states rearranged. The process 700 starts at a state 710 after a user indicates selection of the test module 550. The process 700 then proceeds to a state 720 wherein the test module 550 retrieves test input data from the response file 440. The test input data can include, but is not limited to, audio data 560, grammar 340 (which may have been created or edited with the grammar editor 530), and/or audio data generated via the record audio module 540.

At a state 730 of the process 700, the test module 550 transmits the test data to the speech recognition engine 190. In some embodiments, transmission of data from the test module 550 to the speech recognition engine 190 is implemented by use of the speech port API 194, as shown in FIG. 2. The process 700 next proceeds to a state 740 wherein the speech recognition engine 190 produces a recognition result file 580, and the scoring module 570 receives the transcript 424 and the recognition result file 580 to score the decoding accuracy of the speech recognition engine 190. Systems and methods for scoring the recognition result file 580 are described in related application Ser. No. 60/451227, entitled "SPEECH RECOGNITION CONCEPT CONFIDENCE MEASUREMENT," and filed Feb. 28, 2003. The process 700 next moves to a state 750 wherein the display module 564 can display the results of the scoring to the user. The process 700 then ends at a state 790.

Figure 9:
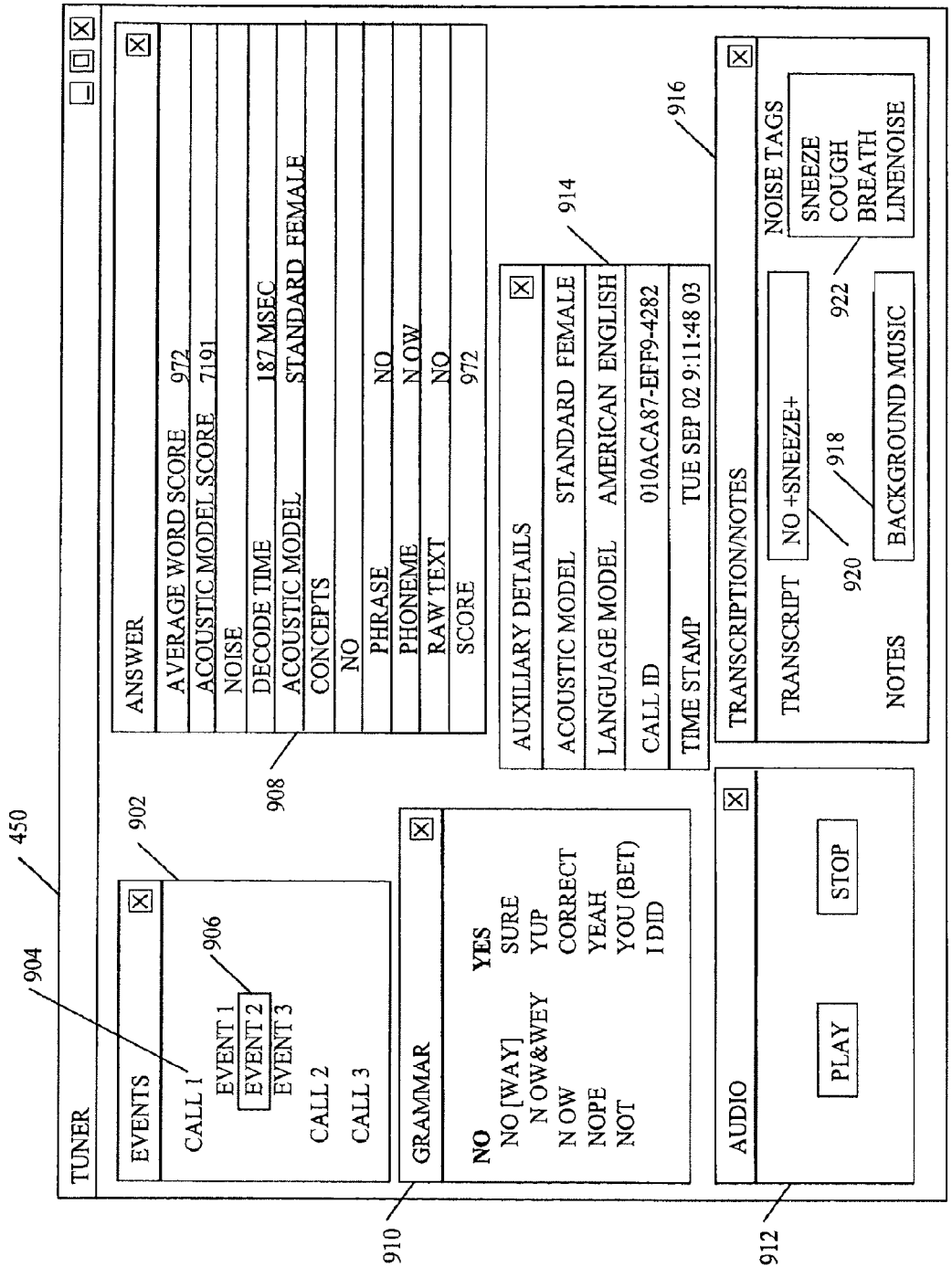
FIG. 9 is an exemplary user interface that can be used in conjunction with certain embodiments of the tuner system of the invention.

FIG. 9 illustrates an exemplary user interface 450 that can be used in conjunction with a tuner system in accordance with one embodiment of the invention. The user interface 450 can include an events window 902 that displays a number of calls 904 and the corresponding events 906 under each call. As shown, the calls can be organized in a tree-like manner such that individual events 906 (for example, event 2) can be selected for analysis. The user interface can further have an answer window 908 that displays information about the recognition result produced by the speech recognition engine 190 for that event. Hence, as illustrated in FIG. 9, the answer window 908 provides, among other things, an average word score, an acoustic model score, the acoustic model (namely, "standard_female") used by the speech recognition engine 190 to decode the audio input (i.e., event 2) under analysis, and the concept returned ("NO"), including the phoneme identified and a confidence score for the concept.

Include in the user interface 450, there can also be provided a grammar window 910 that displays the relevant portion of the grammar 340 that the speech recognition engine 190 used to decode the event 906. In this example, the event 906 relates to a portion of the grammar 340 having the concepts "NO" and "YES." Under each concept there are expected phrases (e.g., no, nope, sure, yeah), and under the phrases there can be phonemes (e.g., "now & wey"). In some embodiments of the user interface 450, an auxiliary details window 914 that displays additional information about the event 906, which can include administrative information such as the identifier for the event (i.e., Call ID) and the time stamp for the event. In some embodiments of the tuner 286 shown in FIG. 4, the details viewing module 480 can include, for example, the answer window 908, grammar window 910, and the auxiliary information window 914.

The user interface 450 can also include a facility 912 for allowing play back of the audio portion corresponding the event 906. As shown, the facility 912 allows for playing and stopping the audio portion. In other embodiments, the facility 912 can also be configured to record audio input. Moreover, in other embodiments, the facility 450 can be further configured to play back the prompt that corresponds to the audio portion of the event 906. For example, an event 906 might include a prompt such as "how spicy do you want your salsa?" and an answer such as "mild." The facility 450 can be configured to play back both the prompt and the response.

In some embodiments, the user interface 450 provides a transcription/notes window 916 for displaying and accepting input associated with a transcript 920 and/or notes 918 for the event 906. As previously discussed, the transcript 920 may be the literal textual representation of the audio input for the event 906. Typically, the transcript is entered into the text field 920 by a user after the user plays back the audio of the event 906. In some embodiments, the transcription/notes window 916 provides a list of "noise tags" that can be used to conveniently attach markers to the transcript of the audio. These noise tags can be used to train the speech recognition engine 190 to interpret, ignore, etc., acoustic phenomena characterized as noise. In the example shown, the transcriber hears the audio input and determines that the customer uttered "no" and also sneezed in response to a prompt.

In some embodiments, the transcription/notes window 916 can be configured to enter the decode from the speech recognition engine 190 into the transcript field 920. In such embodiments, if the decode is exactly the same as what the user hears from the audio play back, the user can then accept the entry in the transcript field 920 as the literal textual representation of the audio input. Thus, in such embodiments, the user does not have to input the entire transcription of the audio input, but rather needs only to accept or modify the entry in the transcript field 920.

As illustrated in FIG. 9, the transcription/notes window 916 may also include a notes field 918. The user can enter any information in the notes field 918 that relates to the event 902. Preferably, the information entered in the notes field 918 is linked to the transcript 920. Moreover, the data for the transcript 920 and the notes 918 can be packaged with a response file 440. In the example shown, the user makes a note that there is music in the background as the customer interacts with the system 170.

An exemplary use of the user interface 450 may be as follows. A file having a number of calls 904 is loaded into the tuner window 450. An event 906 from a call 904 is selected for analysis. The tuner user interface 450 displays the answer window 908, the grammar window 910, and the auxiliary details window 914. The user employs the facility 912 to play back the audio, and then enters a transcription of the audio into the transcription field 920 of the transcription/notes window 916. The user then analyses the information in the grammar window 910, answer window 908, and auxiliary details window 914 to determine if any modifications can be made to improve the performance of the system 170.

By way of example, the user might determine that the typical customer response to the prompt associated with the event 906 is not included in the grammar shown in the grammar window 910. Or, the user might determine that the confidence score shown in the answer window 908 is unacceptably low. In these cases, the user might conclude that a change to the grammar is likely to improve the performance of the system 170. Such a change could be, for example, adding new concepts, phrases, and/or pronunciations to the grammar 340.

Based on the analysis the user might also conclude that the call flow needs to be modified. Hence, the user may attempt changes to the prompts or the order of the prompts, for example, of the call flow. The design of a call flow and the use of call flows in speech recognition systems is further described in related U.S. Application Ser. No. 60/451,353, filed Feb. 27, 2003 and titled "CALL FLOW OBJECT MODEL IN A SPEECH RECOGNITION SYSTEM."

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention.

What is claimed is:

1. A method of tuning a speech recognizer, the method comprising:
    playing a selected portion of a digital audio data file with a digital audio player;
    creating and/or modifying a digital transcript of the selected audio portion;
    displaying information associated with a decode of the selected audio portion on an electronic display, wherein the displayed information includes a menu of selectable noise tags for identifying noise events in the transcript;
    receiving an input selected from the displayed menu, the input identifying at least one noise event in the transcript;
    modifying, by a computing device, the transcript based on the input; and
    utilizing the modified transcript to improve the performance of the speech recognizer.

2. The method of claim 1, wherein the menu comprises a graphical user interface having elements for allowing selection, input, and command entry related to the selectable noise tags.

3. The method of claim 1, wherein the information comprises a confidence score.

4. The method of claim 1, wherein the information comprises an acoustic model score.

5. The method of claim 1, wherein the at least one noise event is a cough.

6. The method of claim 1, wherein the at least one noise event is a sneeze.

7. The method of claim 1, wherein the at least one noise event is a laugh.

8. The method of claim 1, wherein the at least one noise event is a breath.

9. The method of claim 1, wherein speech recognizer performance is improved by training new acoustic models.

10. The method of claim 1, wherein improving the performance of the speech recognizer includes tuning parameters in the speech recognizer that are not acoustic models.

11. The method of claim 1, wherein improving the performance of the speech recognizer comprises using the identified at least one noise event to train the speech recognizer to interpret or ignore acoustic phenomena characterized as noise.

12. The method of claim 1, wherein improving the performance of the speech recognizer comprises building a new acoustic model using the identified at least one noise event.

13. The method of claim 1, further comprising determining, based at least in part on the transcript and the information associated with the decode, a modification of the speech recognizer to improve its performance.

14. The method of claim 13, wherein the modification comprises modifying a grammar of the speech recognizer.

15. The method of claim 14, wherein the modification comprises adding a concept, phrase, word, or phoneme to the grammar.

16. The method of claim 13, wherein the modification comprises modifying a word pronunciation, dictionary, or acoustic model of the speech recognizer.

17. The method of claim 13, wherein the modification comprises modifying a call flow.

18. The method of claim 13, further comprising making a modification to the speech recognizer.

19. The method of claim 18, further comprising iteratively performing the recited steps.

20. A system for facilitating the tuning of a speech recognizer, the system comprising:
    a processor;
    a memory;
    a playback module configured to play a selected portion of a digital audio data file;
    a user interface configured to provide a menu of selectable noise tags for identifying noise events in a transcript;
    an editor module configured to receive input modifying the transcript or the notes, wherein the input includes noise tags, selected from the menu of selectable noise tags, attaching markers to the transcript; and
    a detail viewing module configured to display information associated with a decoding of the selected portion by the speech recognizer, the information including the noise tags identifying noise events in the transcript.

21. The system of claim 20, further comprising a user interface that includes the menu of selectable noise tags.

22. The system of claim 20, wherein the user interface comprises a graphical user interface.

23. The system of claim 20, wherein the information associated with the decoding comprises a grammar associated with the selected portions.

24. The system of claim 23, wherein the grammar comprises a set of responses expected to occur in the selected portions.

25. The system of claim 24, wherein the set of responses comprises phrases, words, and/or phonemes.

26. The system of claim 20, wherein the information associated with the decoding comprises a confidence score.

27. The system of claim 20, wherein the information associated with the decoding comprises an identification of an acoustic model.

28. The system of claim 20, wherein the information associated with the decoding comprises phonemes used by the speech recognizer to decode the selected portions.

* * * * *